US008398871B2

(12) United States Patent
Gao et al.

(10) Patent No.: US 8,398,871 B2
(45) Date of Patent: Mar. 19, 2013

(54) MULTI-LAYER OPTICAL FILTER DESIGNS AND ASSOCIATED SYSTEMS

(75) Inventors: Lu Gao, San Jose, CA (US); Gary Duerksen, Ward, CO (US); Paulo E. X. Silveira, Boulder, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 399 days.

(21) Appl. No.: 12/597,683

(22) PCT Filed: Apr. 25, 2008

(86) PCT No.: PCT/US2008/061657
§ 371 (c)(1),
(2), (4) Date: Sep. 13, 2010

(87) PCT Pub. No.: WO2008/134574
PCT Pub. Date: Nov. 6, 2008

(65) Prior Publication Data
US 2010/0326955 A1    Dec. 30, 2010

Related U.S. Application Data

(60) Provisional application No. 60/913,858, filed on Apr. 25, 2007.

(51) Int. Cl.
*B29D 11/00* (2006.01)
(52) U.S. Cl. .......... 216/24; 359/587; 359/588; 359/589; 359/590; 250/226; 257/E31.121; 257/E31.122; 257/E31.123
(58) Field of Classification Search .......... None
See application file for complete search history.

(56) References Cited

U.S. PATENT DOCUMENTS

| 5,140,464 A | 8/1992 | Kyogoku et al. |
| 7,123,416 B1 * | 10/2006 | Erdogan et al. ............... 359/589 |
| 2006/0169878 A1 | 8/2006 | Kasano et al. |

FOREIGN PATENT DOCUMENTS

DE    102004034419 A1    2/2006

OTHER PUBLICATIONS

International Search Report and Written Opinion issued in related PCT/US2008/061657, dated Aug. 29, 2008, 11 pages.
Response to Written Opinion filed in related PCT/US2008/061657, dated Feb. 25, 2009, 16 pages.
International Preliminary Report on Patentability issued in related PCT/US2008/0616547, dated Jul. 28, 2009, 11 pages.

* cited by examiner

*Primary Examiner* — Lan Vinh
*Assistant Examiner* — Jiong-Ping Lu
(74) *Attorney, Agent, or Firm* — Lathrop & Gage LLP

(57) ABSTRACT

A method for designing a first optical filter, exhibiting a first filter performance satisfying a first preset criterion, and a second optical filter, exhibiting a second filter performance satisfying a second preset criterion, includes providing initial first and second filter designs for the first and second optical filters, respectively, as first and second ordered stacks of layers, respectively. A pair of layers, including a first layer, characterized by a first thickness, and a second layer, characterized by a second thickness, is selected from the first and second ordered stacks of layers. The first thickness is constrained to a first constrained thickness that is a positive integer multiple of the second thickness to yield a constrained first filter design. A predicted performance of the constrained first filter design is determined and compared with the first preset criterion for one of accepting and rejecting the constrained first filter design.

13 Claims, 10 Drawing Sheets

MULTI-LAYER OPTICAL FILTER DESIGNS AND ASSOCIATED SYSTEMS

CROSS-REFERENCE TO RELATED APPLICATIONS

This application claims priority to U.S. Provisional application Ser. No. 60/913,858, filed 25 Apr. 2007 and entitled THIN FILM FILTERS AND ASSOCIATED METHODS, and incorporated herein by reference.

BACKGROUND

Previous disclosures have discussed various methods of optimizing thin film filter set designs particularly in designing color filters compatible with detector fabrication processes. For example, previously disclosed thin film optimization methods involved coupling of certain pairs of layers between Cyan Magenta Yellow ("CMY") or Red Green Blue ("RGB") filter sets and optimization for performance (as disclosed, for example, U.S. provisional application Ser. No. 60/850,429, filed 10 Oct. 2006, entitled ELECTROMAGNETIC ENERGY DETECTION SYSTEM INCLUDING BURIED OPTICS).

TABLE 1

| Layer | Material | Physical thickness (Angstroms) | | | Difference | Mask # |
|---|---|---|---|---|---|---|
| | | Cyan | Magenta | Yellow | | |
| Medium | Polyimide | | | | | |
| 1 | UV SiN | 731.6 | 731.6 | 731.6 | | |
| 2 | BD 1036A | 914.8 | 914.8 | 914.8 | | |
| 3 | UV SiN | 1153.8 | 529.5 | 529.5 | 624.3 | 5 |
| 4 | BD 1036A | 855.0 | 855.0 | 855.0 | | |
| 5 | UV SiN | 1004.9 | 1004.9 | 397.6 | 607.3 | 4 |
| 6 | BD 1036A | 883.2 | 883.2 | 883.2 | | |
| 7 | UV SiN | 1182.7 | 540.5 | 540.5 | 642.2 | 3 |
| 8 | BD 1036A | 883.8 | 883.8 | 883.8 | | |
| 9 | UV SiN | 960.4 | 960.4 | 389.7 | 570.7 | 2 |
| 10 | BD 1036A | 854.7 | 854.7 | 854.7 | | |
| 11 | UV SiN | 1093.0 | 591.2 | 591.2 | 501.8 | 1 |
| | Substrate: PE-OX 11 K | | | | | |
| Total thickness | | 10518.0 | 8749.7 | 7571.6 | | |

TABLE 1 is a summary of an exemplary filter design for a CMY filter including a group of three filter designs. These examples of multilayer thin film filter designs, including first, second and third filter designs are designated in TABLE 1 as Cyan, Magenta, and Yellow, respectively, based on the associated single-color band pass optical response of each filter. Each filter design is provided as an ordered stack of layers such that each of the layers is designated in TABLE 1 as having a given physical thickness of a given material, as will be described immediately hereinafter.

A "Material" column in TABLE 1 specifies an ordered stack of an assortment of three different materials including, by way of example, polyimide, UV silicon nitride ("UV SiN") and BLACK DIAMOND® ("BD") 1036A. Layers 1-11 are designated in TABLE 1 as being arranged in a specific order of materials that is the same for all three filters, over a substrate of PE-OX 11 K. It is noted that the order of materials shown in TABLE 1 (and in subsequent tables including similar information) is given in the order encountered by electromagnetic energy incident thereon. That is, the order of materials is listed and numbered in a "Layer" column from top to bottom such that layer 1 of UV SiN corresponds to a final, or top, layer for the three physical filters, while layer 11 corresponds to the first layer deposited directly on the substrate during the actual fabrication of the filters.

In addition, to specifying an order of materials for all three of the filters, TABLE 1 designates a specific thickness for each selected layer of each filter. For example, layer 11 of the Cyan filter is specified in TABLE 1 as being composed of UV SiN and having a thickness of 1093.0 Angstroms, layer 11 of the Magenta filter is specified as being a 591.2 Angstrom thick layer of UV SiN, and layer 11 of the Yellow filter is specified as a 591.2 Angstrom layer of UV SiN. While the order of materials is the same for all three filters in TABLE 1, the thickness of a given layer of a given material may differ from one filter to another. The foregoing point is summarized, at least in part, in the "Difference" column of TABLE 1, which lists a number of differences in thickness between a corresponding number of pairs of layers that are distributed throughout the group of filters. For example, a thickness difference, having a value of 624.3 Angstroms, is identified in TABLE 1 between layer 3 of the Cyan filter and layer 3 of the Magenta filter. In addition, other thickness differences are identified in a number of pairs of layers that are distributed throughout the group of filters. For example, there are a number of thickness differences between the Cyan filter and the Yellow filter, including a thickness difference of 501.8 Angstroms between layer 11 of the Magenta filter and layer 11 of the Yellow filter.

TABLE 2

| Step # | Description | Material | Deposition Thickness (Angstroms) | Etch depth (Angstroms) | Mask# |
|---|---|---|---|---|---|
| 1 | Blanket deposition | UV SiN | 501.8 | | |
| 2 | Spin coat | Photoresist | | | |
| 3 | Masked exposure | | | | 1 |
| 4 | Plasma etch | | | 501.8 | |
| 5 | Remove photoresist | | | | |
| 6 | Blanket deposition | UV SiN | 591.2 | | |
| 7 | Blanket deposition | BD 1036A | 854.7 | | |
| 8 | Blanket deposition | UV SiN | 570.7 | | |
| 9 | Spin coat | Photoresist | | | |
| 10 | Masked exposure | | | | 2 |
| 11 | Plasma etch | | | 570.7 | |
| 12 | Remove photoresist | | | | |
| 13 | Blanket deposition | UV SiN | 389.7 | | |
| 14 | Blanket deposition | BD 1036A | 883.8 | | |
| 15 | Blanket deposition | UV SiN | 642.2 | | |
| 16 | Spin coat | Photoresist | | | |

TABLE 2-continued

| Step # | Description | Material | Deposition Thickness (Angstroms) | Etch depth (Angstroms) | Mask# |
|---|---|---|---|---|---|
| 17 | Masked exposure | | | | 3 |
| 18 | Plasma etch | | | 642.2 | |
| 19 | Remove photoresist | | | | |
| 20 | Blanket deposition | UV SiN | 540.5 | | |
| 21 | Blanket deposition | BD 1036A | 883.2 | | |
| 22 | Blanket deposition | UV SiN | 607.3 | | |
| 23 | Spin coat | Photoresist | | | |
| 24 | Masked exposure | | | | 4 |
| 25 | Plasma etch | | | 607.3 | |
| 26 | Remove photoresist | | | | |
| 27 | Blanket deposition | UV SiN | 397.6 | | |
| 28 | Blanket deposition | BD 1036A | 855.0 | | |
| 29 | Blanket deposition | UV SiN | 624.3 | | |
| 30 | Spin coat | Photoresist | | | |
| 31 | Masked exposure | | | | 5 |
| 32 | Plasma etch | | | 624.3 | |
| 33 | Remove photoresist | | | | |
| 34 | Blanket deposition | UV SiN | 529.5 | | |
| 35 | Blanket deposition | BD 1036A | 914.8 | | |
| 36 | Blanket deposition | UV SiN | 731.6 | | |

Attention is now turned to TABLE 2, which summarizes an exemplary set of thin film fabrication processes required in fabricating the three-filter set described in relation to TABLE 1. These processes include a number of blanket deposition processes for specific materials that are designated in a "Material" column of TABLE 2. Each blanket deposition process is also specified as being deposited to a specific thickness as indicated in TABLE 2 by a "Thickness" column. The "Description" column of TABLE 2 further delineates a number of etching processes for removing a given thickness of material, the thickness being specified according to an "Etch depth" column. It is noted that a given etching process may require additional supporting process steps, in accordance with well-known thin film fabrication techniques that will be familiar to one having ordinary skill in the art and as indicated in the Description column of TABLE 2. For example, an etching process can include spin coating of photoresist, masked exposure, and removal of photoresist. It is recognized herein that a given etching step, combined with additional supporting process steps required for the given etching step, may together be regarded as encompassing a "recipe" for that given etching step. For example, steps 2-5 of TABLE 2 may be regarded as cooperating with one another to serve as a single recipe for etching 501.8 Angstroms of UV SiN. Additionally, a given deposition process, like an etching process, may itself be regarded as a recipe, and any given deposition requires a series of well-known steps that may depend on the details of a particular deposition system that may be employed to perform the given deposition.

TABLE 3

| UV SiN deposition recipes | BD deposition recipes | Etching recipes |
|---|---|---|
| 501.8 Å | 854.7 Å | 501.8 Å |
| 389.7 Å | 883.8 Å | 570.7 Å |
| 570.7 Å | 855.0 Å | 642.2 Å |
| 642.2 Å | 914.8 Å | 607.3 Å |
| 397.6 Å | | 624.3 Å |
| 607.3 Å | | |
| 624.3 Å | | |
| 529.5 Å | | |
| 914.8 Å | | |
| 731.6 Å | | |

In view of the foregoing description, a given set of filters may be produced by utilizing a number of recipes for deposition and etching of the various materials. An exemplary set of recipes is summarized in TABLE 3, which lists the various deposition and etching recipes in accordance with the fabrication process outlined in TABLE 2. First (i.e., leftmost) and second (i.e., center) columns of TABLE 3 lists a total number of fourteen deposition recipes required to perform the fabrication process of TABLE 2, each deposition recipe serving to deposit a specific thickness of one of UV SiN and BD. A third (i.e., rightmost) column in TABLE 3 itemizes the five etching recipes that are required to perform the fabrication process of TABLE 2. In the deposition and/or etching of each layer in a thin film filter, each combination of material and physical thickness may require the development of a recipe for that layer and, as summarized in TABLE 3, a total of 19 recipes are required for producing the CMY filter set of TABLE 1.

Turning now to the figures, wherein like components are indicated by like reference numbers throughout the various figures, attention is now directed to FIG. 1. It is noted that, while descriptive terminology such as, for example, top, bottom, right and left, may be used with respect to these descriptions, this terminology has been adopted with the intent of facilitating the reader's understanding and is not intended as being limiting. Further, the figures may not be drawn to scale for purposes of illustrative clarity. FIG. 1 shows a plot, generally indicated by reference number 6, illustrating the filter responses (i.e., transmission as a function of wavelength) for the Cyan, Magenta, and Yellow filters, respectively, as described above with reference to TABLES 1 and 2. A vertical axis 9 corresponds to percent transmission of electromagnetic energy (e.g., as light) through a given filter, and a horizontal axis 12 corresponds to a wavelength of the given electromagnetic energy. A first filter response 15 corresponds to the percent transmission through the Cyan filter for a range of wavelengths of the incident electromagnetic energy. A second response 18 corresponds to a filter response of the Magenta filter previously discussed with reference to TABLE 1. A third filter response 21 corresponds to a filter response of the Yellow filter of TABLE 1.

It is noted that the design of the various filters may be configured such that the filter responses 15, 18 and 21 may each satisfy a given preset criterion. As one example of a preset criterion, it will be readily appreciated by those skilled in the art that for a particular application, such as for use in an imaging system, each filter may be required to transmit a predetermined percentage of electromagnetic energy (e.g., light) at a given wavelength or over a given wavelength range.

Attention is now directed to FIG. 2 in conjunction with FIG. 1. FIG. 2 shows a plot, generally indicated by a reference number 26, illustrating the filter response of an RGB filter, which has been synthesized based on the CMY filter set of TABLE 1. While the plots of FIG. 1 each correspond to one and only one associated filter in TABLE 1, the plots of FIG. 2 each correspond to combinations of filters in TABLE 1, following standard conventions that are based upon well-known derivations that employ additive and subtractive relationships between CMY response and RGB response of the filter set. FIG. 2 has the same vertical axis 9 and horizontal axis 12 that are utilized in FIG. 1. A first filter response 27 corresponds to a first filter that is substantially transmissive with respect to a first range of wavelengths corresponding to the color Red. A second filter response 28 corresponds to a second filter that is substantially transmissive with respect to a second range of wavelengths corresponding to the color Green. Finally, a third filter response 31 corresponds to a third filter that is substantially transmissive over a third range of wavelengths corresponding to the color Blue. As one example, the three filter responses of FIG. 2 may be collectively referred to, in accordance with well-known conventions and terms of art, as a RGB filter set.

While the three-filter set described in association with TABLES 1-3 and FIGS. 1 and 2 provide adequate performance, the exemplary design requires nineteen distinct recipes in fabrication, each requiring fabrication and handling steps that may consequently add to the overall cost and reduce the overall yield of the filter set. Systems and methods disclosed herein overcome various disadvantages associated with current thin film filter designs and fabrication processes.

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to improvements.

In one embodiment, a method for designing a set of at least two multi-layer optical filters is disclosed. The set of at least two multi-layer optical filters includes (i) a first optical filter that exhibits a first filter performance that satisfies a first preset criterion and (ii) a second optical filter that exhibits a second filter performance that satisfies a second preset criterion and is different from the first filter performance. The method includes providing an initial first filter design for the first optical filter, as a first ordered stack of layers, and an initial second filter design for the second optical filter, as a second ordered stack of layers. The method further includes selecting a pair of layers, including a first layer, characterized by a first thickness, from the first ordered stack of layers, and a second layer, characterized by a second thickness, from the second ordered stack of layers. The method also includes constraining the first thickness to a first constrained thickness that is a positive integer multiple of the second thickness so as to yield a constrained first filter design. The method further includes determining a predicted performance of the constrained first filter design. Still further, the method includes comparing the predicted performance of the constrained first filter design with the first preset criterion as at least one input for one of accepting and rejecting the constrained first filter design.

In another embodiment, a method for designing a set of at least two multi-layer optical filters is disclosed. The method includes defining a first difference pair of layers by selecting one layer from each one of the first and second ordered stacks in the constrained first filter design and the initial second filter design, respectively. The first difference pair of layers is characterized by a first thickness difference that is a difference in layer thicknesses of the layers so selected as the first difference pair. The method further includes defining a distinct, second difference pair of layers by selecting a layer from each one of the first and second ordered stacks in the constrained first filter design and the initial second filter design, respectively. The second difference pair of layers is characterized by a second thickness difference that is a difference in layer thickness between the layers so selected as the second difference pair. Further, the method includes constraining at least one of the layer thicknesses of the layers selected as the first difference pair of layers such that the first thickness difference is equal to the second thickness difference so as to yield a further constrained first filter design. Still further, the method includes determining a predicted performance of the further constrained first filter design, and comparing the predicted performance of the constrained first filter design with the first preset criterion as an input for one of accepting and rejecting the further constrained first filter design.

In another embodiment, a set of at least two multi-layer filters is disclosed. Each one of the multi-layer filters includes an ordered stack of layers, each layer being characterized by a material and a thickness. The set of filters includes a first optical filter configured to exhibit a first response satisfying a first preset criterion, and a second optical filter configured to exhibit a second response satisfying a second preset criterion. Each layer in the ordered stack of layers is one of: (i) equal in thickness to another layer formed of the same material; (ii) equal in thickness to an integer multiple of a thickness of another layer formed of the same material; and (iii) when considered in combination with another layer selected from a different filter thus forming a first pair of layers, equal in a thickness difference within the first pair of layers in comparison to a second pair of layers selected across different filters.

DETAILED DESCRIPTION

While the previously described thin film filter design approaches have focused on certain manufacturing concerns, such as the selection of materials with suitable refractive indices or the number of masks needed for realization of the design, additional considerations may be desired for further reducing the fabrication cost in implementing such filter set designs. Applicants recognize herein that, in order to reduce the complexity of fabrication processes for filter sets and, thereby, the cost of fabrication, it may be highly advantageous to reduce the number of recipes required in the fabrication of a given thin film filter design, as will be described below. In addition, it is further recognized herein that reducing the number of recipes may result in additional benefits.

Figure 3:
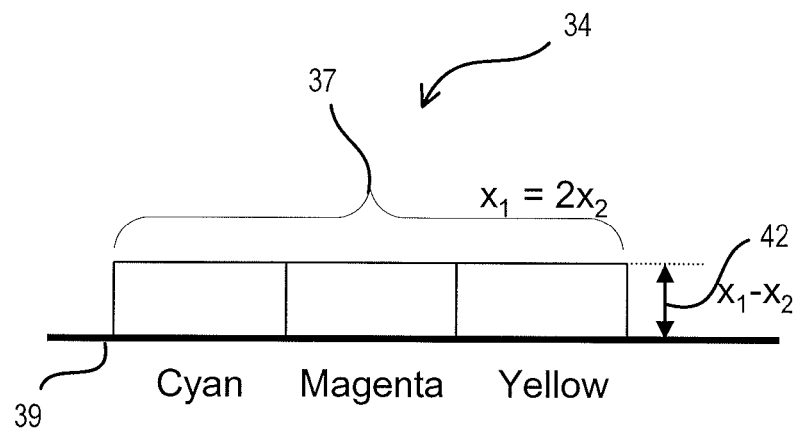
FIGS. 3-5 show an exemplary process for achieving certain film thicknesses using a limited number of recipes, in accordance with an embodiment.
Figure 4:
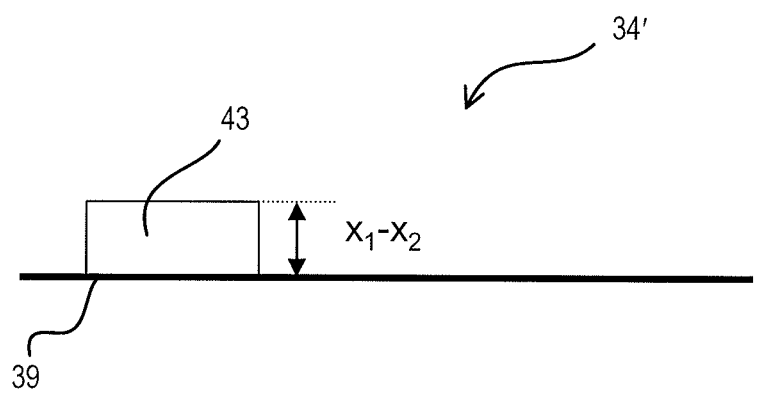
Figure 5:
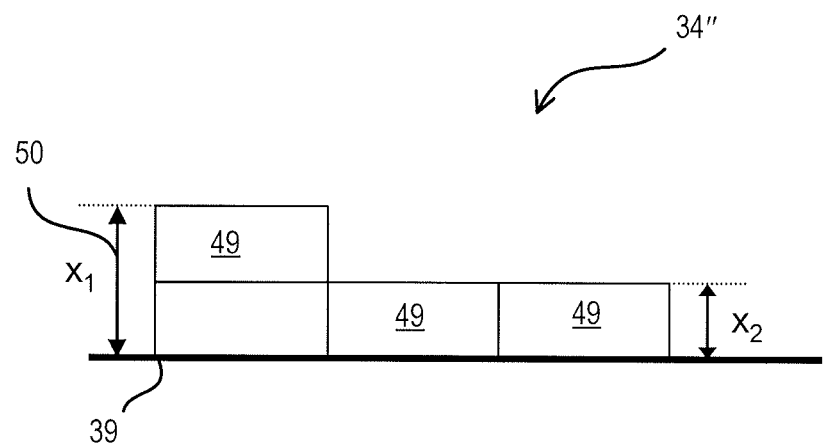

Turning again to the figures, attention is now directed to FIGS. 3-5, which illustrate three intermediate steps of an exemplary fabrication process for achieving two different thicknesses in three fabrication steps. FIG. 3 is a cross-sectional view of a filter set, generally indicated by reference number 34, including three thin filters during an early stage of their fabrication. The three thin film filters of FIG. 3 may be regarded as representing some portion of a design of a set of Cyan, Magenta and Yellow filters that is shown at some intermediate stage of design and/or fabrication.

Filter set 34 includes a layer 37 that has been deposited onto a substrate 39. Layer 37 has a thickness 42 as indicated by a double-headed arrow. Thickness 42 is shown as having a value of $x_1-x_2$, where $x_1$ and $x_2$ are parameters that may be adjusted and/or constrained as part of a given design and/or optimization process. As part of a design routine, it may be desirable to adjust and/or constrain parameters, such as $x_1$ and $x_2$, that may be combined to specify one or more physical dimensions, such as thickness. For example, thickness 42 of layer 37 may be constrained, based on parameters $x_1$ and $x_2$, such that thickness value $x_1-x_2$ is constrained according to a relationship $x_1=2x_2$. For example, FIG. 3 may represent an intermediate fabrication step wherein layer 37 of a uniform thickness $x_1-x_2$ is deposited on a surface 39 according to the constraint $x_1=2x_2$. It is noted that, while layer 37 is shown as three distinct blocks corresponding to the Cyan, Magenta and Yellow filters in filter set 34, the separation of these blocks is for illustrative purposes only; in actual fabrication, the three distinct blocks may be deposited as a single uniform layer having thickness 42.

Now turning to FIGS. 4 and 5 in conjunction with FIG. 3, FIGS. 4 and 5 show cross-sectional views of filter sets 34' and 34", respectively, illustrating additional intermediate stages of fabrication of the CMY filter set. In FIG. 4, two of the sections of layer 37, corresponding to the Magenta and Yellow filters, have been etched away while the Cyan filter section was masked off. Consequently, only a layer 43 with a thickness $x_1-x_2$ is left in the Cyan filter section. Then, in FIG. 5, another layer 49, having a thickness $x_2$, is deposited uniformly across all three CMY filter sections, thereby resulting in a total thickness of $x_1$ (as indicated using a double-headed arrow) in the Cyan filter section and $x_2$ thick layers in the Magenta and Yellow filter sections. It is notable that, in order to achieve the two different thicknesses shown in FIG. 5, only two deposition recipes and one etch recipe, combined with one mask, were required.

TABLE 4

|        | Cyan  | Magenta | Yellow |
|--------|-------|---------|--------|
| UV SiN | $x_1$ | $x_2$   | $x_2$  |
| BD     | $x_3$ | $x_3$   | $x_3$  |
| UV SiN | $x_4$ | $x_5$   | $x_5$  |
| BD     | $x_6$ | $x_6$   | $x_6$  |
| SiN    | $x_8$ | $x_7$   | $x_8$  |

By employing a series of additional fabrication processes similar to those illustrated in FIGS. 3-5, including recipes for deposition and etch of an assortment of different materials, a complete CMY thin film filter may be fabricated with the exemplary physical thicknesses as summarized in TABLE 4. TABLE 4 represents an exemplary design for a CMY filter set based in part on initial process steps described immediately above with reference to FIGS. 3-5. The design of the CMY filter set represented in TABLE 4 relies on an assortment of three different materials including UV SiN, BD and SiN, and successive layers are represented in TABLE 4 in an order in which they are fabricated. For example, as shown in FIGS. 3-5, each of the three filters has a first layer of UV SiN deposited on a substrate such that the Cyan filter includes a first layer of UV SiN having a thickness $x_1$, and the Magenta and Yellow filters each include a first layer of UV SiN having a thickness of $x_2$ It is recognized herein, that in order to reduce a number of recipes required in the fabrication of this exemplary thin film filter, the thicknesses of the various layers can be matched as much as possible. For example, in order to achieve the layer requirements summarized in TABLE 4, the required deposition recipes are shown in TABLE 5. As noted above, each recipe may correspond to a series of one or more fabrication steps including a combination of deposition, etch and masking processes.

TABLE 5

| Recipe      | Notes         |
|-------------|---------------|
| $x_1 - x_2$ | $x_1 > x_2$   |
| $x_2$       | UV SiN        |
| $x_3$       | BD            |
| $x_4 - x_5$ | $x_4 > x_5$   |
| $x_5$       | UV SiN        |
| $x_6$       | BD            |
| $x_7 - x_8$ | $x_7 > x_8$   |
| $x_8$       | SiN           |

Figure 6:
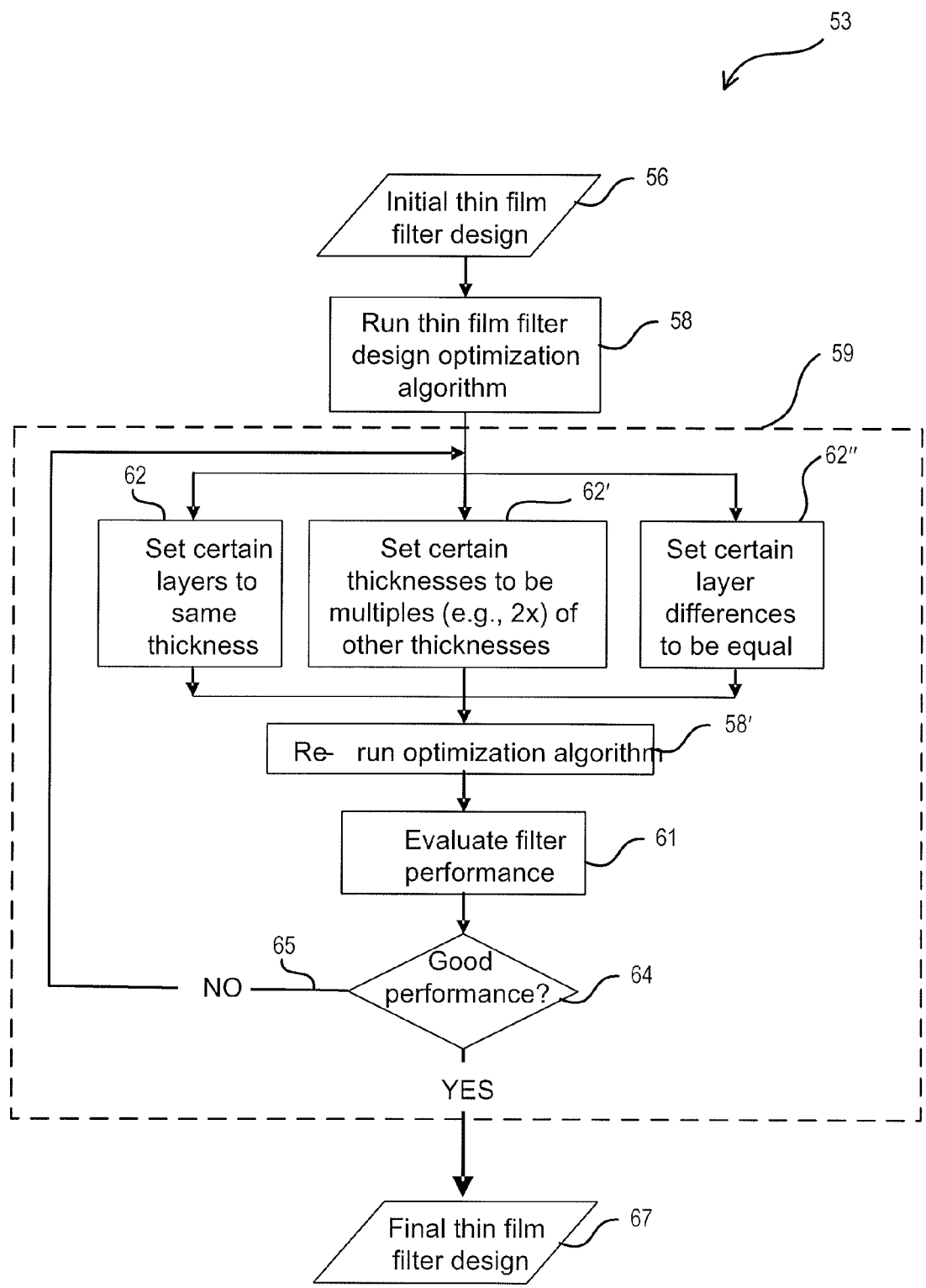
FIG. 6 is a flowchart illustrating an exemplary design process for an exemplary thin film filter set, in accordance with an embodiment.

Attention is now directed to FIG. 6, which shows a flowchart of an exemplary process 53 for reducing the number of recipes required for a thin film, multi-layer optical filter design. Process 53 begins with the input of an initial thin film filter design in a step 56. Such an input filter set design as provided at step 56 may be, for example, a known filter design produced using one or more of a variety of well-known techniques. One example of such an initial thin film filter design is may be, for instance, the prior art filter set design summarized in TABLE 1. After the initial design has been provided, process 53 proceeds to a step 58, in which the initial thin film filter design may be optimized by running an optimization algorithm. For instance, the optimization algorithm may involve modifying at least a portion of the provided design by changing one or more thickness of one or more layers within the design. The optimization algorithm may, for example, include optimizing the design of a given constrained filter and/or filter set that has been modified. For example, the optimization algorithm may include (i) computer-modeling of the filter and/or filter set design utilizing commercially available computer software packages such as ZEMAX®, MATLAB®, ESSENTIAL MACLEOD®, for evaluating a predicted response of the constrained design, and (ii) modifying one or more layer thickness while utilizing the aforementioned software for modeling the effects of the modification upon the response of the constrained design.

Process 53 then proceeds to an optimization routine 59 (indicated by a dashed rectangle). As part of optimization routine 59, at least one of three different constraint adjustment procedures are performed, as will be described immediately hereinafter. These three different constraint adjustment procedures may be performed jointly, in parallel or in series, and not all of the three procedures need to be performed. A first constraint adjustment step 62 involves determining if some layers of the same material have similar thicknesses (e.g., within 10 to 20%). If so, these layers are constrained to the same thickness in step 62, then the constrained design is fed to a step 58' for a re-running of the optimization algorithm. A second constraint adjustment step 62' involves determining if any of the layers may be estimated as having a thickness that is an integer multiple of the thickness of another layer (e.g., within 10 to 20%). For instance, in the exemplary process shown in FIGS. 3-5, the layer thicknesses were constrained such that $x_1 = 2x_2$. If so, these layers are constrained to integer multiples of each other in step 62', then the constrained design is fed to step 58' for re-optimization. A third constraint adjustment step 62" includes determination of whether a thickness difference between a pair of adjacent layers is similar to a thickness difference between another pair of adjacent layers. For example, with reference to TABLES 1-3, if thickness differences $(x_1-x_2)$ and $(x_4-x_5)$ are similar, such that $(x_1-x_2) \approx (x_4-x_5)$ to within 10 to 20%, then one or more of the four layers included in these two layer pairs may be constrained such that the thickness differences are equal to one another such that $(x_1-x_2)=(x_4-x_5)$.

Following the constraint adjustment processes, the resulting constrained designs are re-optimized in step 58', in which the thin film optimization algorithm is run again. The performance of the resulting re-optimized thin film filter design is evaluated in an evaluation step 61. Step 61 may involve, for instance, evaluating a predicted filter performance of the re-optimized thin film filter design by generating filter performance plots and comparing them to a preset criteria defining the desired performance of the filters. Next, a decision 64 made to determine whether the predicted filter performance is sufficient for satisfying one or more preset criteria. If the performance is unsatisfactory, then the optimization routine is returned to the constraint adjustment processes as indicated by a path 65. If the filter performance is sufficient, then a final thin film filter design is generated in a step 66.

It may be appreciated that process 53 may be applied iteratively, and resulting filter designs may be modified a number of times by re-applying process 53 such that the final thin film filter design of a given iteration serves as the initial thin film filter design of an immediately following iteration. As described above, it is again noted that the constraint adjustment steps may be applied in a flexible manner and that they may be applied separately or together in a given iteration of process 53. For instance, in a first example, a given iteration of process 53 may rely solely on application of constraint adjustment step 62 for constraining one layer of a single pair of layers within the initial filter set (without applying any other constraints during the given iteration), and in an immediately following iteration process 53 may rely on the application of constraint adjustment step 62 to a different pair of layers in the filter set. In a second example, the iteration of process 53 may rely solely on application of constraint adjustment step 62 with respect to the single pair of layers, and the immediately following iteration may rely on the application of constraint adjustment step 62' with respect to a different pair of layers. In a third example, a given iteration may rely simultaneously on constraint adjustment steps 62 and 62" by performing both steps simultaneously with respect to two different pairs of layers that are disposed within the filter set, with both pairs being separate and distinct from one another. Thus, a variety of combinations and permutations may be employed for the use of these adjustment procedures, in an iterative manner, while continuing to fall within the scope of the teachings herein, and the examples provided here are not intended as being limiting.

TABLE 6

| | | Physical thickness (Angstroms) | | | | |
| --- | --- | --- | --- | --- | --- | --- |
| Layer | Material | Cyan | Magenta | Yellow | Difference | Mask # |
| Medium | Polyimide | | | | | |
| 1 | UV SiN | 905.15 | 905.15 | 905.15 | | |
| 2 | BD 1036A | 798.12 | 798.12 | 798.12 | | |
| 3 | UV SiN | 1234.1 | 617.05 | 617.05 | 617.05 | 5 |
| 4 | BD 1036A | 798.12 | 798.12 | 798.12 | | |
| 5 | UV SiN | 1062.6 | 1062.6 | 445.53 | 617.05 | 4 |
| 6 | BD 1036A | 798.12 | 798.12 | 798.12 | | |
| 7 | UV SiN | 1234.1 | 617.05 | 617.05 | 617.05 | 3 |
| 8 | BD 1036A | 798.12 | 798.12 | 798.12 | | |
| 9 | UV SiN | 1062.6 | 1062.6 | 445.53 | 617.05 | 2 |
| 10 | BD 1036A | 798.12 | 798.12 | 798.12 | | |
| 11 | UV SiN | 1234.1 | 617.05 | 617.05 | 617.05 | 1 |
| | Substrate: PE-OX 11 K | | | | | |
| Total thickness | | 10723.3 | 8872.1 | 7638.0 | | |

An exemplary thin film filter design, summarized in TABLE 6, may be generated in accordance with process 53 of FIG. 6, for example by utilizing the design of TABLE 1 as the initially provided design. It is to be appreciated that the design of TABLE 6 includes a number of layers each having the same material and thickness as one another. For example layers 2, 6, 8 and 10, distributed throughout all three filters, all are 798.12 Angstrom thick layers of BD 1036A. In view of this consideration, it is recognized by inspection of TABLE 6 that all the 798.12 Angstrom layers may be deposited based on repetitive use of a single deposition recipe corresponding to a deposition of 798.12 Angstroms. In contrast, the corresponding layers 2, 6, 8 and 10 of the prior art design, described in TABLE 1, have thicknesses of 914.8, 883.2, 883.8 and 854.7 Angstroms, respectively. Therefore, it may be appreciated that, as a result of using the thin film filter set design of TABLE 1 as the initial filter design then applying process 53 thereto in accordance with the foregoing descriptions, the filter design summarized in TABLE 6 may be produced using a reduced number of deposition recipes as compared to the filter design of TABLE 1.

Furthermore, with respect to the design of TABLE 6, it may be noted that a number of thickness differences are identified and listed in the difference column of TABLE 6 such that a number of thickness differences are delineated in a manner that is consistent with the listing of thickness differences in TABLE 1. Additionally, it may be recognized that the thickness differences distributed throughout the filter design of TABLE 6 are all the same as one another. For example, layer number 3 of the Cyan filter differs from layer number 3 of the Magenta and Yellow filters according to a thickness difference of 617.05 Angstroms. In addition, there are a number of other pairs of filters in the group of filters having a thickness difference of 617.05 Angstroms between one layer of one filter and another layer of the other filter of the pair. For example, Cyan filter and the Magenta filter form a pair of filters that has a thickness difference of 617.05 Angstroms between layer number 7 of the Magenta filter and layer number 7 of the Cyan filter. Subsequently, the filter described in TABLE 6 may be produced using a fewer number of recipes as compared to the filter design of TABLE 1.

TABLE 7

| Step # | Description | Material | Deposition Thickness (Angstroms) | Etch depth (Angstroms) | Mask# |
|---|---|---|---|---|---|
| 1 | Blanket deposition | UV SiN | 617.05 | | |
| 2 | Spin coat | Photoresist | | | |
| 3 | Masked exposure | | | | 1 |
| 4 | Plasma etch | | | 617.05 | |
| 5 | Remove photoresist | | | | |
| 6 | Blanket deposition | UV SiN | 617.05 | | |
| 7 | Blanket deposition | BD 1036A | 798.1 | | |
| 8 | Blanket deposition | UV SiN | 617.05 | | |
| 9 | Spin coat | Photoresist | | | |
| 10 | Masked exposure | | | | 2 |
| 11 | Plasma etch | | | 617.05 | |
| 12 | Remove photoresist | | | | |
| 13 | Blanket deposition | UV SiN | 445.5 | | |
| 14 | Blanket deposition | BD 1036A | 798.1 | | |
| 15 | Blanket deposition | UV SiN | 617.05 | | |
| 16 | Spin coat | Photoresist | | | |
| 17 | Masked exposure | | | | 3 |
| 18 | Plasma etch | | | 617.05 | |
| 19 | Remove photoresist | | | | |
| 20 | Blanket deposition | UV SiN | 617.05 | | |
| 21 | Blanket deposition | BD 1036A | 798.1 | | |
| 22 | Blanket deposition | UV SiN | 617.05 | | |
| 23 | Spin coat | Photoresist | | | |
| 24 | Masked exposure | | | | 4 |
| 25 | Plasma etch | | | 617.05 | |
| 26 | Remove photoresist | | | | |
| 27 | Blanket deposition | UV SiN | 445.5 | | |
| 28 | Blanket deposition | BD 1036A | 798.1 | | |
| 29 | Blanket deposition | UV SiN | 617.05 | | |
| 30 | Spin coat | Photoresist | | | |
| 31 | Masked exposure | | | | 5 |
| 32 | Plasma etch | | | 617.05 | |
| 33 | Remove photoresist | | | | |
| 34 | Blanket deposition | UV SiN | 617.05 | | |
| 35 | Blanket deposition | BD 1036A | 798.1 | | |
| 36 | Blanket deposition | UV SiN | 905.2 | | |

TABLE 8

| UV SiN deposition recipes | BD deposition recipes | Etching recipes |
|---|---|---|
| 617.05 Å | 798.1 Å | 617.05 Å |
| 445.5 Å | | |
| 905.2 Å | | |

The fabrication processes required in the fabrication of the exemplary thin film filter design are summarized in TABLE 7, which lists fabrication processes that may be utilized for producing the group of filters according to the design of TABLE 6. It may be readily seen that the filter set design summarized TABLE 6 may be generated using a total of only five recipes, as summarized in TABLE 8, as compared to the nineteen recipes required for producing the prior art filter of TABLE 1, as summarized in TABLE 3.

Figure 1:
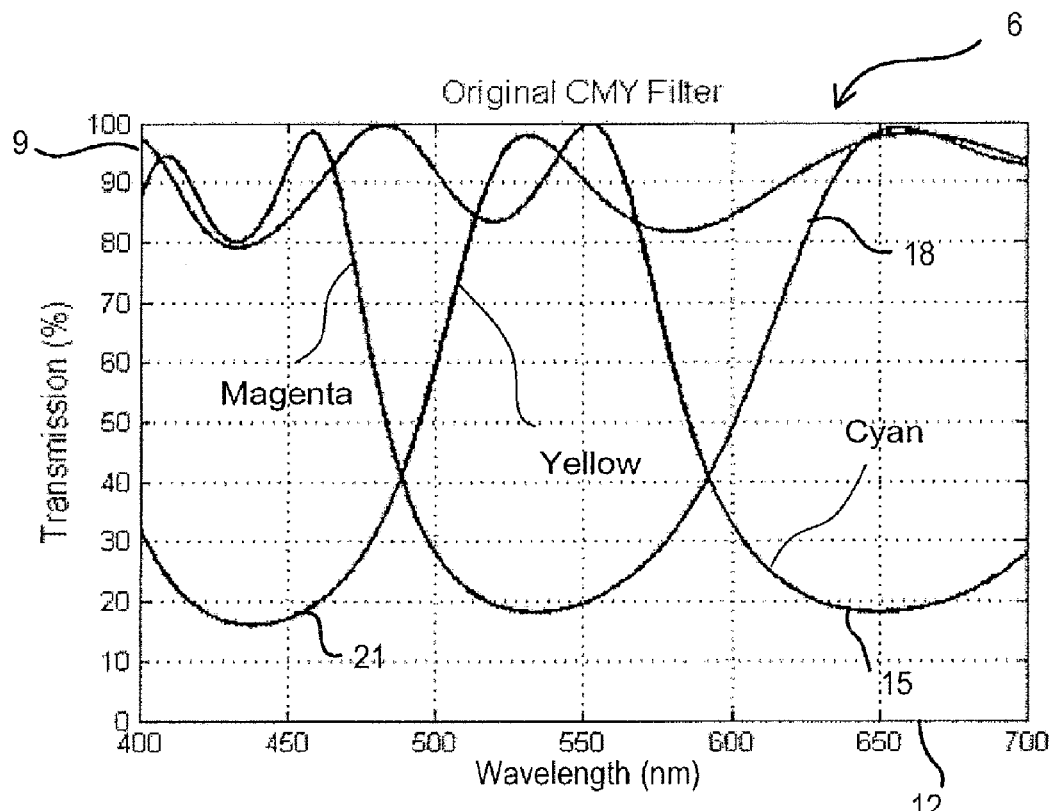
FIG. 1 is a graph of transmission as a function of wavelength for a prior art thin film filter set for Cyan, Magenta and Yellow wavelength ranges.
Figure 2:
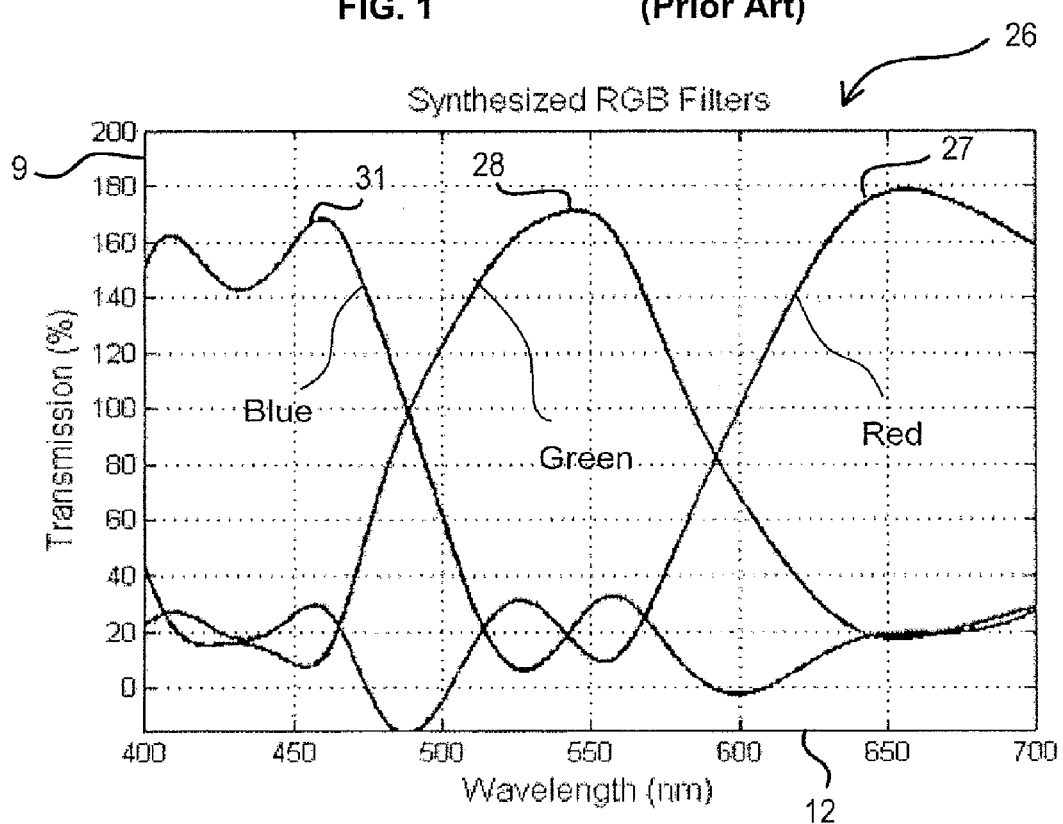
FIG. 2 is a graph of transmission as a function of wavelength for the prior art thin film filter set, further combined to function in Red, Green and Blue wavelength ranges.
Figure 7:
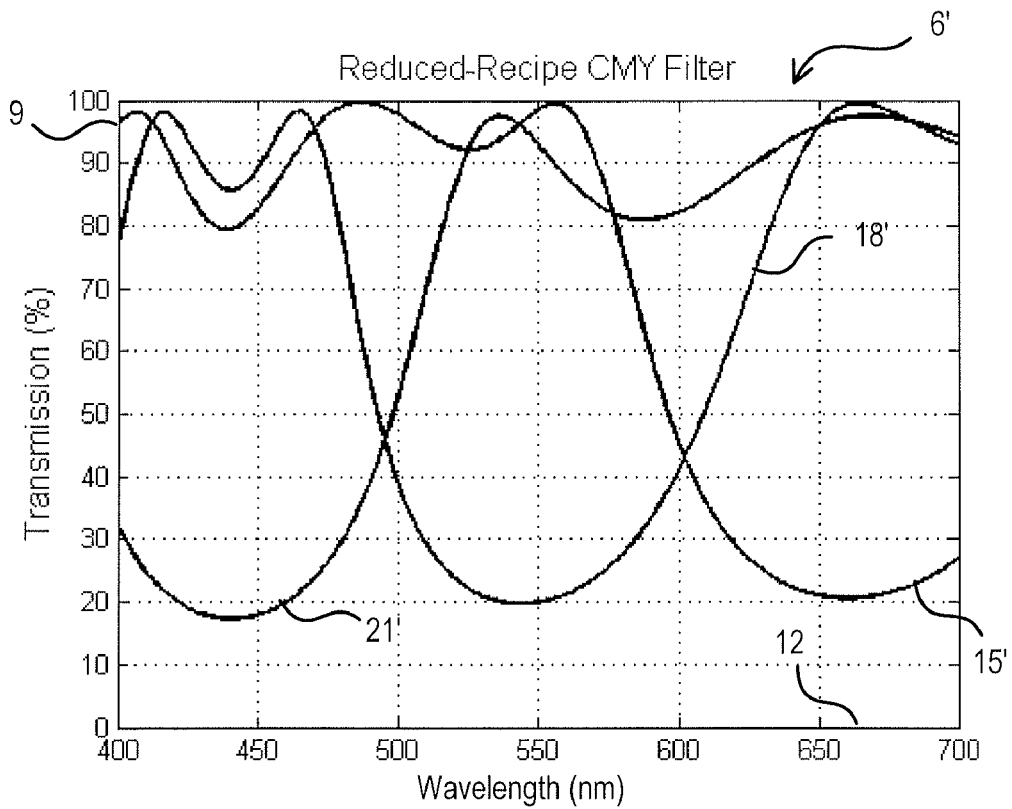
FIG. 7 is a graph of transmission as a function of wavelength for a prior art thin film filter set for Cyan, Magenta and Yellow wavelength ranges, designed in accordance with an embodiment.

Attention is now directed to FIG. 7, which is a graph, generally indicated by reference number 6', having the same vertical axis 9 and horizontal axis 12 that are utilized in FIGS. 1 and 2. The performance of the exemplary CMY thin film filter design, according to TABLE 6, is shown in FIG. 7. A first filter response 15' represents the Cyan filter response, a second filter response 18' represents the Magenta filter response, and a third filter response 21' represents the Yellow filter response. A comparison may be made between the performance that is represented by plots in FIG. 1 with those in FIG. 7, in conjunction with associated TABLES 1-3 and 6-8, respectively. Based on the comparison, it may be seen that the exemplary CMY thin film filter design of TABLE 6 achieves comparable performance utilizing a remarkably reduced number of deposition and etching recipes (i.e., a total of five) in comparison to the prior art CMY filter of TABLE 1, which requires a total of nineteen recipes.

Figure 8:
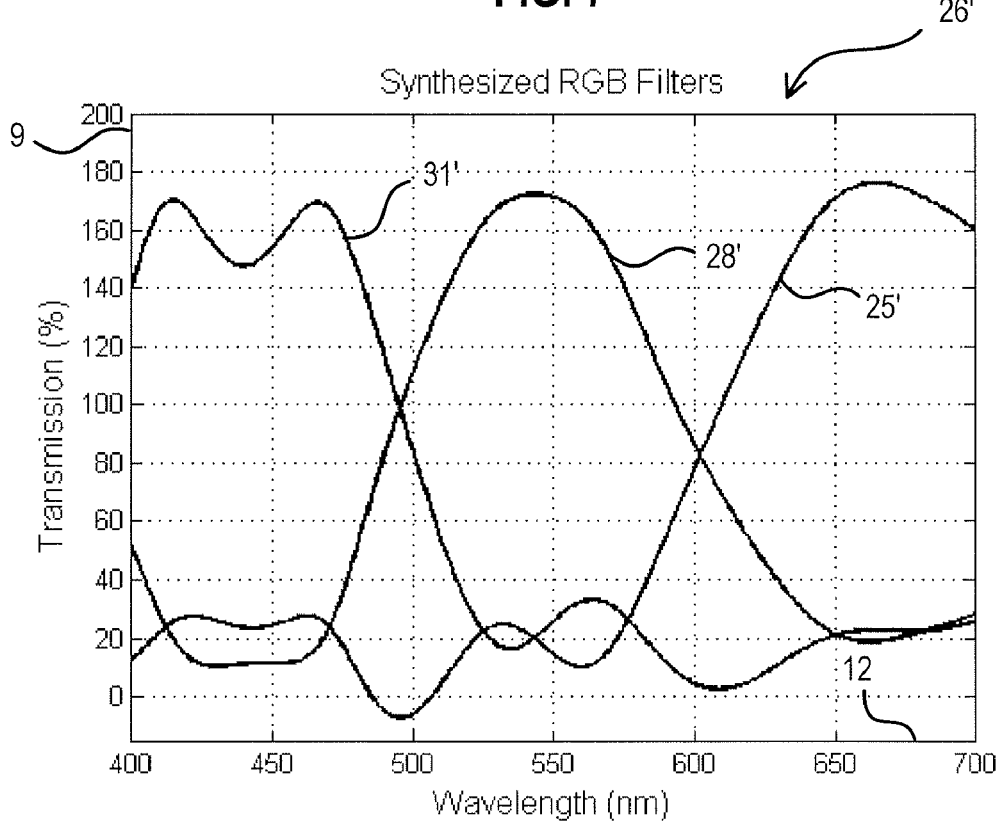
FIG. 8 is a graph of transmission as a function of wavelength for the prior art thin film filter set, further combined to function in Red, Green and Blue wavelength ranges, in accordance with an embodiment.

Attention is now directed to FIG. 8, showing a graph, generally indicated by reference number 26', having the same vertical axis 9 and horizontal axis 12 that are utilized in FIGS. 1, 2, and 7. The graph includes a set of three plots for filter responses for an RGB filter set synthesized from the reduced recipe CMY filter set design summarized in TABLE 6 in a manner that is consistent with previous descriptions in reference to FIG. 2. It is recognized herein that Red, Green, and Blue responses 25', 28' and 31' (associated with the filter set of TABLE 6) are remarkably similar to responses 25, 28 and 31 (associated with the filter set of TABLE 1). Therefore, at least with respect to many possible applications, both of the associated filter sets may be considered sufficient for satisfying a given preset criterion that may be associated with a selected one of the applications. Remarkably, as a result of applying process 53 to the filter set of TABLE 1, the resulting filter set of TABLE 6 may be produced using substantially fewer recipes than the filter set of TABLE 1, therefore achieving sweeping advantages over similar filter sets designed and produced in a conventional manner. Furthermore, in comparing the RGB performance plots as shown in FIGS. 2 and 8, it is to be appreciated that the performance of the exemplary reduced-recipe RGB filter set is more symmetric than that of the prior art thin film filter, thereby presenting a further advantage.

Using the specification to this point and FIGS. 3-8, it is considered that one of ordinary skill in the art may readily practice the invention in view of the teachings therein. However, for purposes of still further illustrative clarity, the aforedescribed CMY filter design will be depicted and described immediately hereinafter in a structural form that illustrates the CMY filter as specified above in TABLE 6 and in a manner that graphically represents the fabrication processes described above with regard to TABLES 7 and 8.

Figure 9:
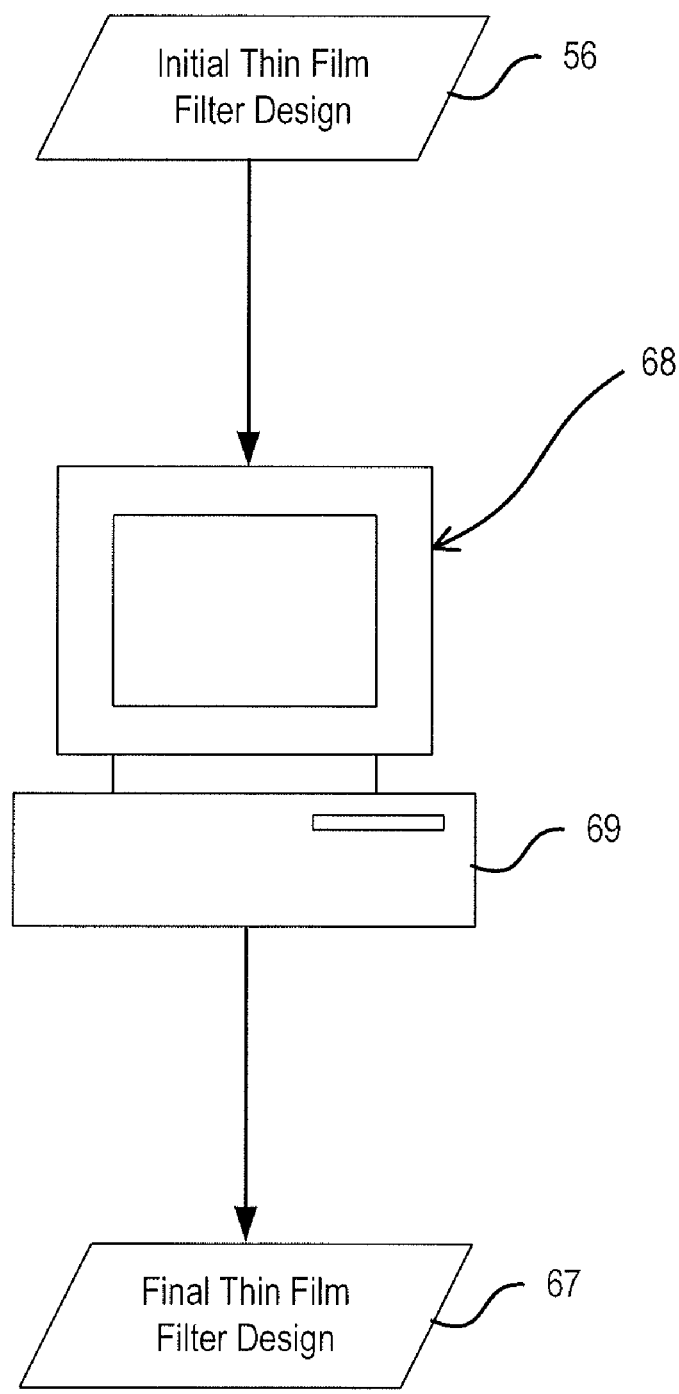
FIG. 9 shows a computer system including memory containing algorithms for execution of the exemplary design process of FIG. 6.

Turning to FIG. 9 in conjunction with FIG. 6, a computer implementation of the aforedescribed design process is illustrated. FIG. 9 shows a computer 68 including memory 69. Memory 69 is programmed with algorithms corresponding to multi-layer optical filter design process 53 of FIG. 6 such that, by input of an initial thin film filter design (e.g., the filter design summarized in TABLE 1) in step 56, computer 68 performs the aforedescribed process for reducing the number of recipes so as to produce a final thin film filter design (e.g., the filter design summarized in TABLE 6) in step 67.

Attention is now directed to FIGS. 10A-10E in conjunction with TABLES 6-8. FIGS. 10A-10E collectively illustrate an example of a procedure in which the fabrication processes of TABLE 7 may be applied for producing the filter set of TABLE 6 utilizing the five recipes identified with reference to TABLE 8. Corresponding to the values used in TABLES 6-8, $X_1$=1234.1 Angstroms of UV SiN, $X_2$=617.05 Angstroms of UV SiN, $X_3$=798.12 Angstroms of BD 1036A, $X_4$=1062.6 Angstroms of UV SiN and $X_5$=905.15 Angstroms of UV SiN. It is to be understood that a single filter structure is illustrated as being modified in a step-wise manner, and therefore the filter structure is shown as a series of intermediate structures, as it changes from one step to the next. Accordingly, a number of these steps will be described immediately hereinafter in a manner that is consistent with changes in filter structure that take place from one step to the next during fabrication.

Figure 10A:
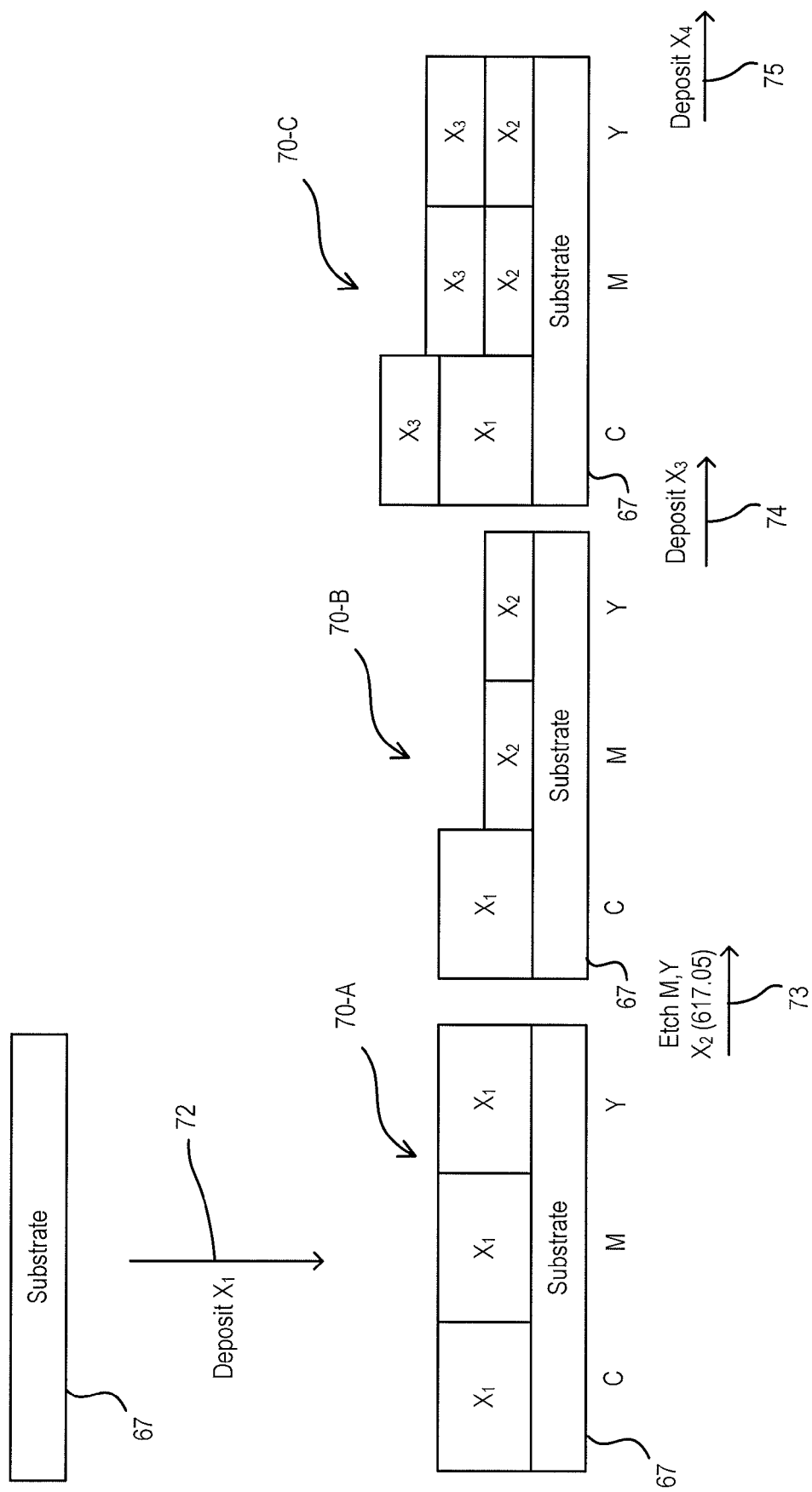
FIGS. 10A-10E illustrate a step-wise fabrication process for an exemplary Cyan, Magenta and Yellow filter set, in accordance with an embodiment.
Figure 10B:
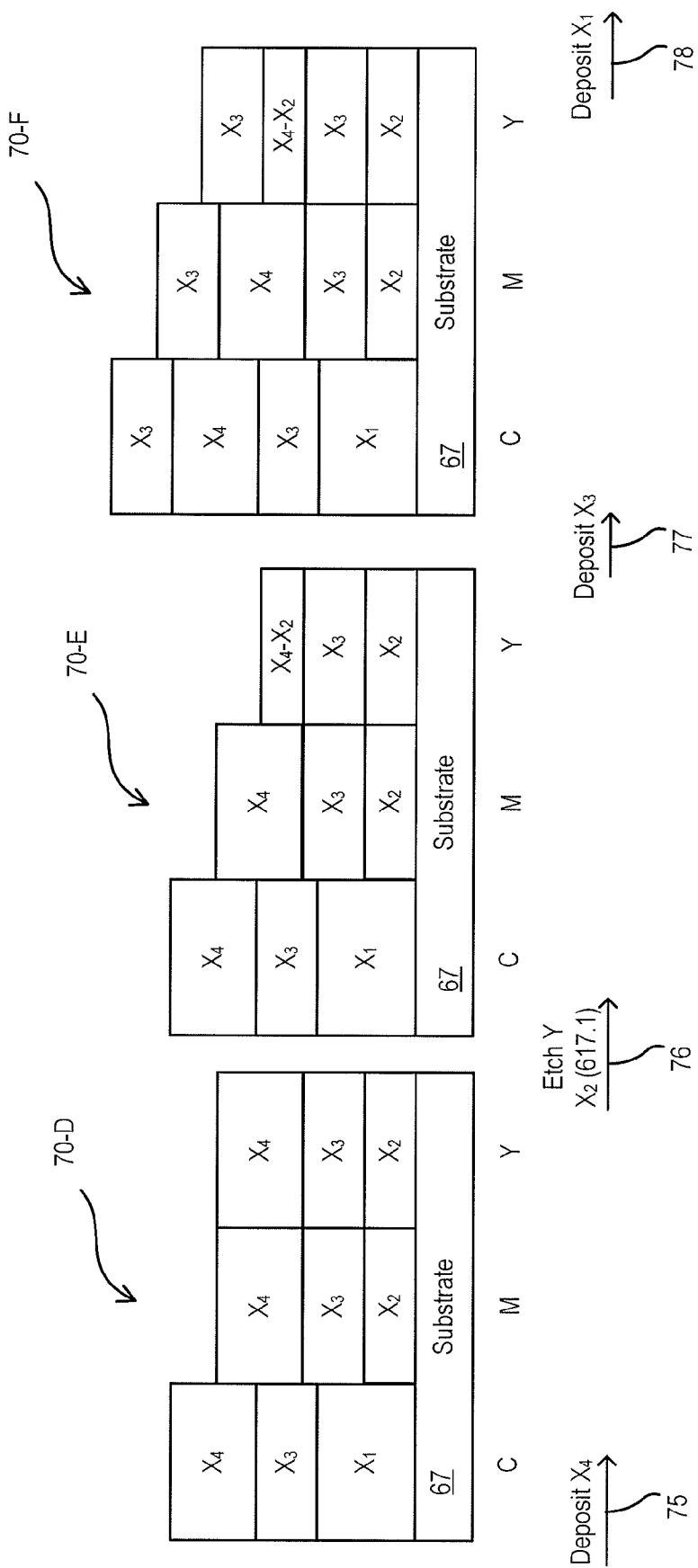
Figure 10C:
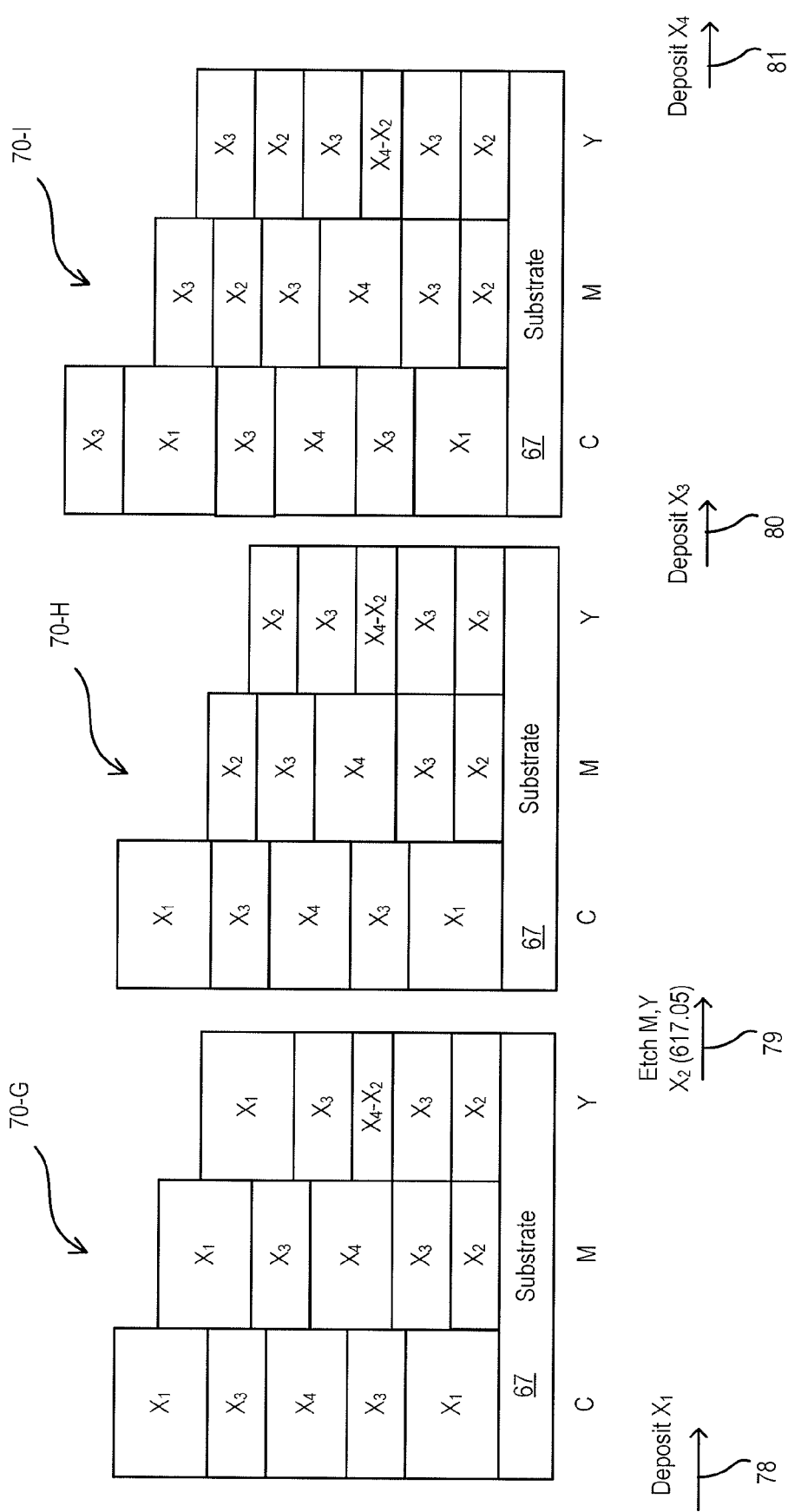
Figure 10D:
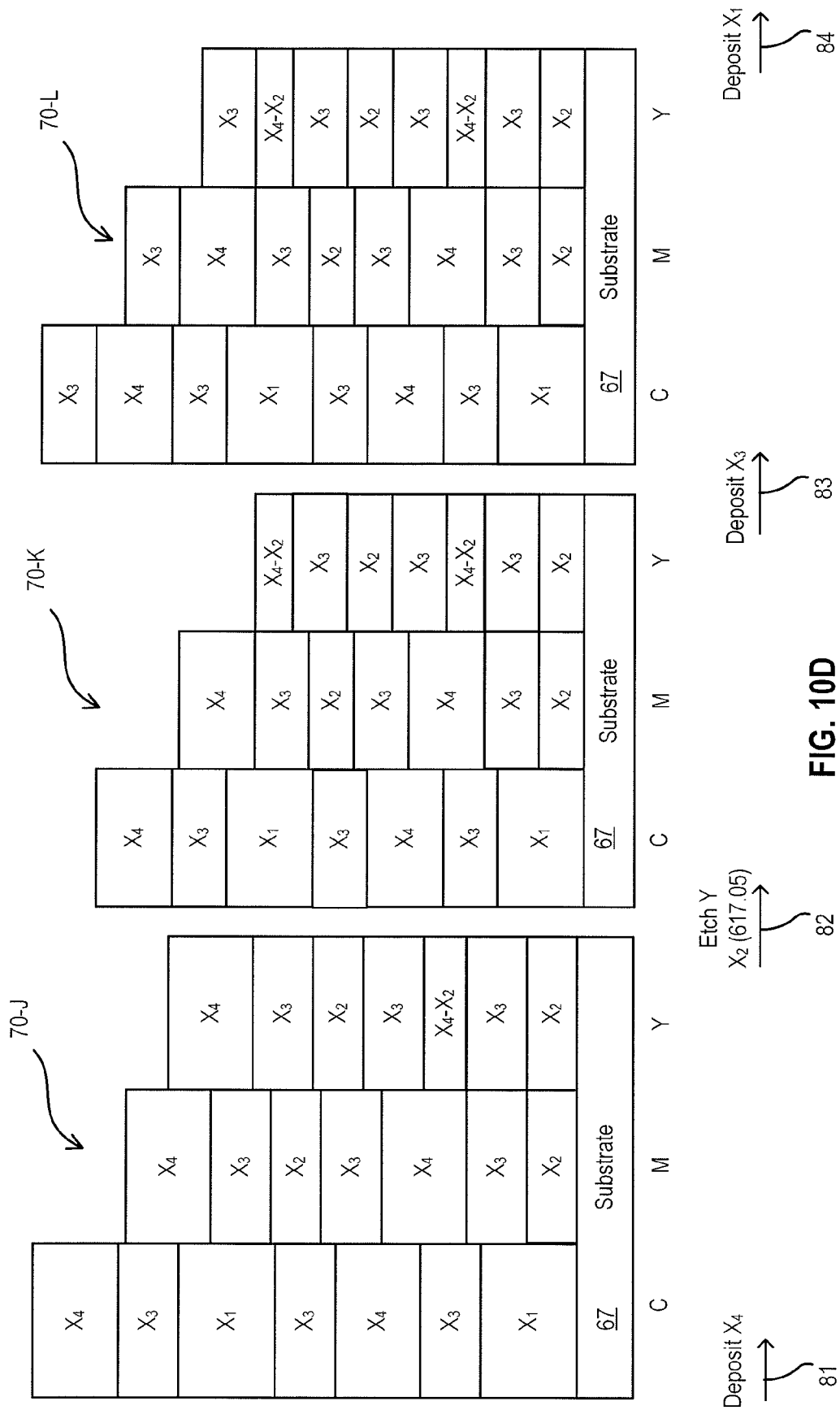

In an initial step, illustrated in FIG. 10A, a blanket deposition is performed in a deposition step 72, in which $X_1$=1234.1 Angstroms of UV SiN (e.g., using two successive depositions of $X_2$=617.05 Angstroms) is deposited over a substrate 67 to form a first intermediate filter structure 70-A. The procedure next employs an etching step 73, utilizing the 617.05 Angstrom etching recipe, described above with reference to TABLES 7 and 8 (as indicated by an arrow in conjunction and a corresponding reference notation, shown above the arrow), resulting in a second intermediate filter structure 70-B. In other words, intermediate filter structure 70-B is produced through modifying first intermediate filter structure 70-A by performing the 617.05 Angstrom etching recipe for removing 617.05 Angstroms of material from a portion of first intermediate structure 70-A.

Figure 10E:
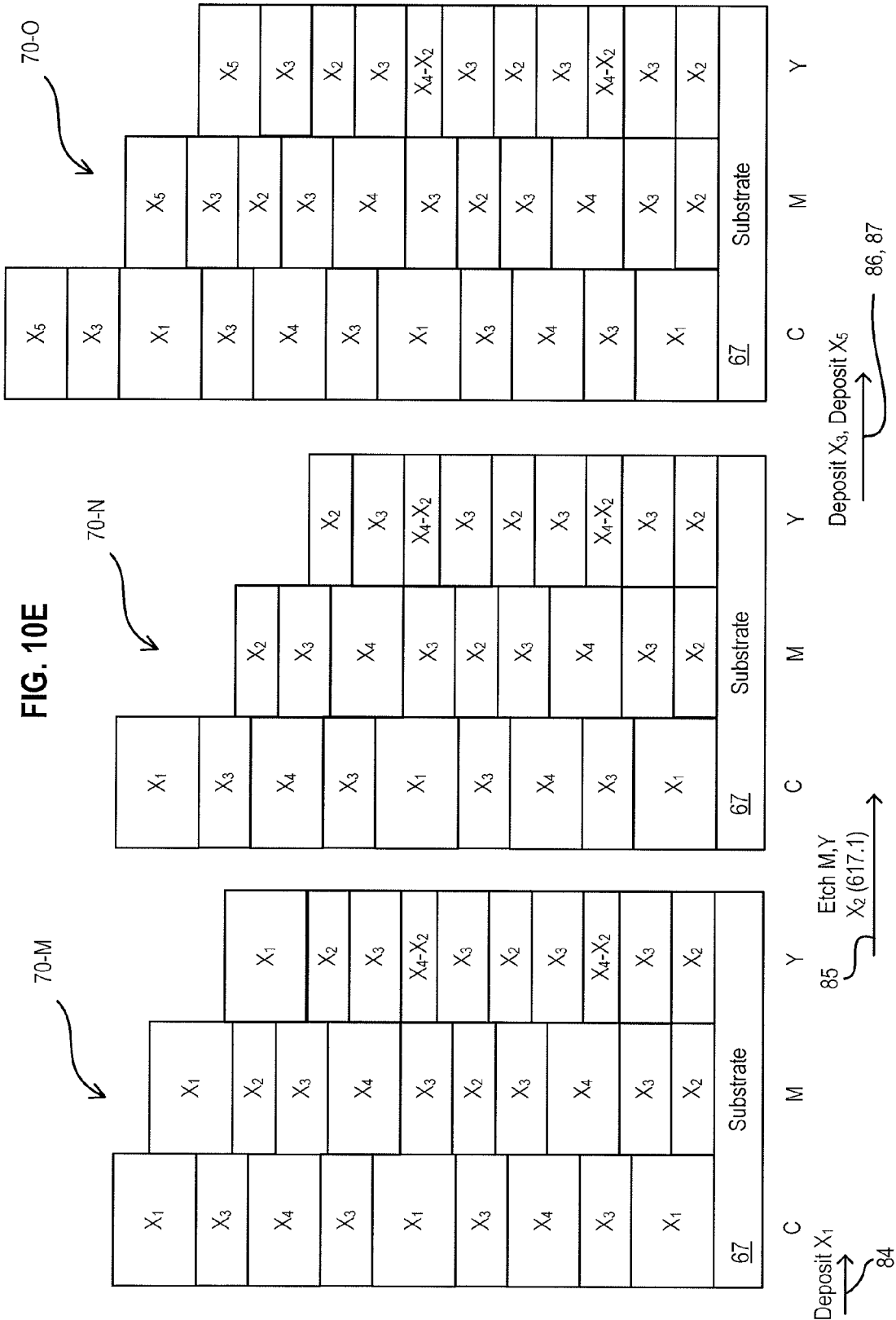

In a series of additional steps 74-87, the filter is fabricated utilizing the recipes of TABLE 7, as shown in FIGS. 10A-10E and in a manner that is consistent with the description immediately above, resulting in a completed filter structure as indicated by reference number 70-O in FIG. 10E. Based on the foregoing descriptions of these figures, and the notations in the figures themselves when considered in conjunction with TABLES 6-8, the change in the structure produced by each step should be readily apparent to the reader.

It is noted that the matter contained in the above description or shown in the accompanying drawings is to be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for designing a set of at least two multi-layer optical filters for fabrication on a substrate including (i) a first optical filter that exhibits a first filter performance that satisfies a first preset criterion and (ii) a second optical filter that exhibits a second filter performance that satisfies a second preset criterion and is different from said first filter performance, said method comprising:
    (a) providing an initial first filter design for the first optical filter, as a first ordered stack of layers on the substrate, and an initial second filter design for the second optical filter, as a second ordered stack of layers on the substrate;
    (b) selecting a pair of layers, including a first layer of a material, characterized by a first thickness, from said first ordered stack of layers, and a second layer of the material, characterized by a second thickness, from said second ordered stack of layers;
    (c) constraining the first thickness to a first constrained thickness that is a positive integer multiple of the second thickness so as to yield a constrained first filter design;
    (d) evaluating a predicted performance of the constrained first filter design; and
    (e) comparing the predicted performance of the constrained first filter design with the first preset criterion as at least one input for one of accepting and rejecting the constrained first filter design.

2. The method of claim 1, wherein selecting the pair of layers comprises choosing the first and second layers such that the first thickness, before constraining, is within a ten to twenty percent range of the second thickness.

3. The method of claim 1, further comprising:
    (f) changing at least a portion of the constrained first filter design, while maintaining the first constrained thickness, to produce a modified first filter design;
    (g) evaluating a predicted performance of the modified first filter design; and
    (h) comparing the predicted performance of the modified first filter design with the first preset criterion as at least one input for one of accepting and rejecting the modified first filter design.

4. The method of claim 1, each layer in the first and second ordered stacks of layers being formed on the substrate using a given recipe including at least one fabrication process, each fabrication process comprising one of (i) deposition, and (ii) etching, such that the initial first and second filter designs each requires an initial number of recipes,
    wherein constraining the first thickness to the first constrained thickness comprises utilizing a reduced number of recipes in generating the constrained first filter design, such that the reduced number of recipes is less than the initial number of recipes.

5. The method of claim 1, the first preset criterion including a requirement that the first optical filter transmits electromagnetic energy over a first wavelength range and the second preset criterion including a requirement that the second optical filter transmits electromagnetic energy over a second wavelength range that is different from the first wavelength range, wherein evaluating comprises calculating a transmission spectrum provided by the constrained first filter design, and wherein comparing comprises assessing a correspondence between the transmission spectrum so calculated and the first wavelength range associated with the first preset criterion.

6. The method of claim 5 including selecting said first wavelength range to correspond to a selected one of magenta, yellow and cyan, and selecting said second wavelength range to correspond to a different selected one of magenta, yellow and cyan.

7. The method of claim 5 including selecting said first wavelength range to correspond to a selected one of red, green and blue, and selecting said second wavelength range to correspond to a different selected one of red, green and blue.

8. The method of claim 1, further comprising:
(f) defining a first difference pair of layers by selecting one layer from each one of the first and second ordered stacks in the constrained first filter design and the initial second filter design, respectively, the first difference pair of layers being characterized by a first thickness difference that is a difference in layer thicknesses of the layers so selected as the first difference pair;
(g) defining a distinct, second difference pair of layers by selecting a layer from each one of the first and second ordered stacks in the constrained first filter design and the initial second filter design, respectively, the second difference pair of layers being characterized by a second thickness difference that is a difference in layer thickness between the layers so selected as the second difference pair;
(h) constraining at least one of the layer thicknesses of the layers selected as the first difference pair of layers such that the first thickness difference is equal to the second thickness difference so as to yield a further constrained first filter design;
(i) evaluating a predicted performance of the further constrained first filter design; and
(j) comparing the predicted performance of the constrained first filter design with the first preset criterion as an input for one of accepting and rejecting the further constrained first filter design.

9. A method for designing a set of at least two multi-layer optical filters including (i) a first optical filter that exhibits a first filter performance that satisfies a first preset criterion and (ii) a second optical filter that exhibits a second filter performance that satisfies a second preset criterion and is different from said first filter performance, said method comprising:
(a) providing an initial first filter design for the first optical filter, as a first ordered stack of layers, and an initial second filter design for the second optical filter, as a second ordered stack of layers;
(b) selecting a pair of layers, including a first layer of a material, characterized by a first thickness, from said first ordered stack of layers, and a second layer of the material, characterized by a second thickness, from said second ordered stack of layers;
(c) constraining the first thickness to a first constrained thickness that is a positive integer multiple of the second thickness so as to yield a constrained first filter design;
(d) evaluating a predicted performance of the constrained first filter design; and (e) comparing the predicted performance of the constrained first filter design with the first preset criterion as at least one input for one of accepting and rejecting the constrained first filter design;
and further comprising, responsive to accepting the constrained first filter design:
(f) setting the constrained first filter design as the initial first filter design;
(g) selecting a different pair of layers from the first and second ordered stacks of layers; and
(h) repeating steps (c)-(e).

10. A method for designing a set of at least two multi-layer optical filters including (i) a first optical filter that exhibits a first filter performance that satisfies a first preset criterion and (ii) a second optical filter that exhibits a second filter performance that satisfies a second preset criterion and is different from said first filter performance, said method comprising:
(a) providing an initial first filter design for the first optical filter, as a first ordered stack of layers, and an initial second filter design for the second optical filter, as a second ordered stack of layers;
(b) selecting a pair of layers, including a first layer of a material, characterized by a first thickness, from said first ordered stack of layers, and a second layer of the material, characterized by a second thickness, from said second ordered stack of layers;
(c) constraining the first thickness to a first constrained thickness that is a positive integer multiple of the second thickness so as to yield a constrained first filter design;
(d) evaluating a predicted performance of the constrained first filter design; and
(e) comparing the predicted performance of the constrained first filter design with the first preset criterion as at least one input for one of accepting and rejecting the constrained first filter design;
and further comprising, upon rejecting the constrained first filter design:
(f) selecting a different pair of layers from the first and second ordered stacks of layers; and
(g) repeating steps (c)-(e) using the different pair of layers as the aforerecited pair of layers.

11. A method for designing a set of at least two multi-layer optical filters for fabrication on a substrate including (i) a first optical filter that exhibits a first filter performance that satisfies a first preset criterion and (ii) a second optical filter that exhibits a second filter performance that is different from said first filter performance that satisfies a second preset criterion, said method comprising:
(a) providing an initial first filter design for the first optical filter, as a first ordered stack of layers on the substrate, and an initial second filter design for the second optical filter, as a second ordered stack of layers on the substrate, each layer in the first and second ordered stacks of layers being characterized by a layer thickness;
(b) defining a first pair of layers by selecting a layer of a first material from each one of the first and second ordered stacks, the first pair of layers being characterized by a first thickness difference that is a difference in layer thicknesses of the layers so selected;
(c) defining a different, second pair of layers by selecting a layer of a second material from each one of the first and second ordered stacks, the second pair of layers being characterized by a second thickness difference defined as a difference in layer thicknesses of the layers so selected;
(d) constraining at least one of the layer thicknesses of the layers selected to define the first pair of layers such that the first thickness difference is equal to the second thickness difference so as to yield a constrained first filter design;

(e) evaluating a predicted performance of the constrained first filter design; and (f) comparing the predicted performance of the constrained first filter design with the first preset criterion as an input for one of accepting and rejecting the constrained first filter design.

12. The method of claim 11, further comprising:

(g) changing at least a portion of the constrained first filter design, while still constraining the layer thicknesses such that the first thickness difference is equal to the second thickness difference, to produce a modified first filter design;

(h) evaluating a predicted performance of the modified first filter design; and (i) comparing the predicted performance of the modified first filter design with the first preset criterion as an input for one of accepting and rejecting the modified first filter design.

13. The method of claim 11, wherein defining the first and second pairs of layers comprises choosing the first and second pairs of layers such that the first thickness difference, before constraining, is within a ten to twenty percent range of the second thickness difference.

* * * * *